Aug. 18, 1931.   G. W. DAVEY   1,819,016
AIR AND WATER COOLED FURNACE AND GENERATOR BLOCK
Filed Dec. 29, 1925   2 Sheets-Sheet 1

George W. Davey
INVENTOR

BY
Charles A. Clark
ATTORNEY

Aug. 18, 1931.  G. W. DAVEY  1,819,016
AIR AND WATER COOLED FURNACE AND GENERATOR BLOCK
Filed Dec. 29, 1925  2 Sheets-Sheet 2

George W. Davey
INVENTOR

BY
Charles A. Clark
ATTORNEY

Patented Aug. 18, 1931

1,819,016

UNITED STATES PATENT OFFICE

GEORGE W. DAVEY, OF LONG ISLAND CITY, NEW YORK

AIR AND WATER COOLED FURNACE AND GENERATOR BLOCK

Application filed December 29, 1925. Serial No. 78,250.

My invention relates to high refractory blocks utilized in the construction of the linings of furnaces, generators or the like, and is more particularly concerned with sectional refractory walls or structures built up of a series of superimposed, air and water cooled refractory blocks.

One object of my invention is to provide a unit air and water cooled refractory block of novel construction adapted to expand horizontally and vertically as a unit.

Another object of my invention is to provide a unit, interlocking, replaceable refractory air and water cooled block that is individually movable, in a horizontal direction and vertically in slidable engagement and gas sealed unity with adjacent blocks of a similar character.

A still further object of my invention is to provide a reversible, replaceable, unit air and water cooled refractory block that can be slid into place between vertically parallel, spaced tubes comprising their supporting means and water transmitting means.

The salient features of my invention are pointed out hereinafter and illustrated in the accompanying drawings, wherein similar reference characters designate corresponding parts throughout the several views, in which:—

Figure 1:
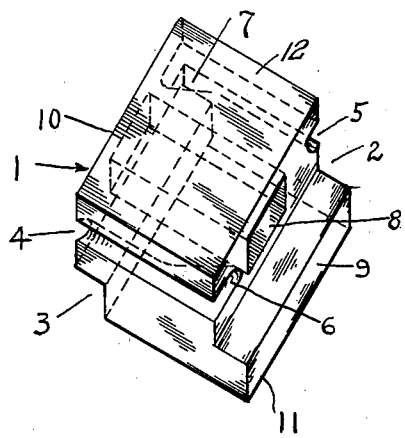
Figure 1 is an isometric view of an air and water cooled refractory furnace block.
Figure 2:
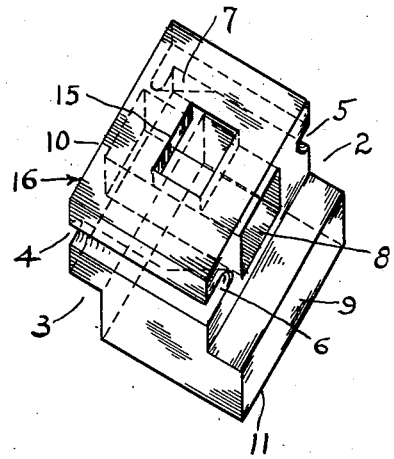
Figure 2 is an isometric view of another form of an air and water cooled refractory furnace block with an air inlet entering the air flue from the back.

The air and water cooled furnace block 1, in Figure 1, with the oppositely arranged notches 2 and 3, having grooves 4 and 5, deeper on one end than the other as clearly shown at 6 and 7, has a centrally located flue 8 from top 9 to bottom 10, parallel to the front face 11 and back face 12.

Figure 6:
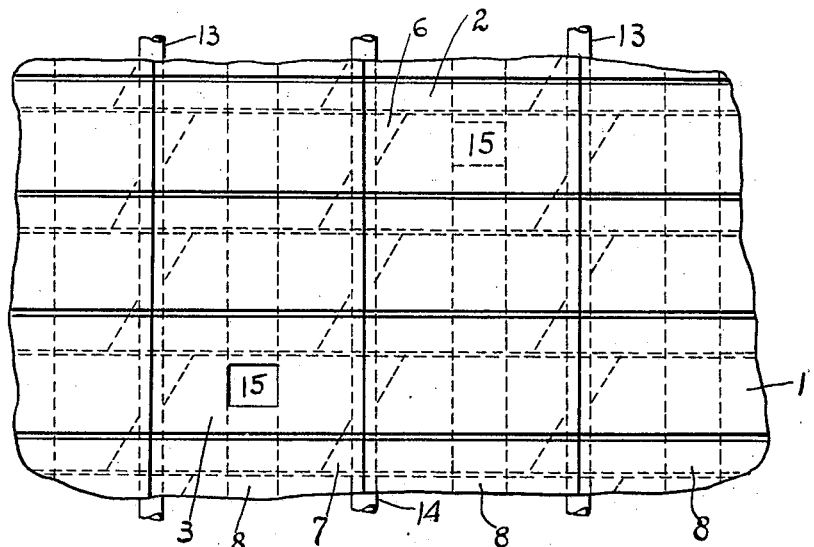
Figure 6 is a fragmentary front elevation of a wall built up of the blocks.

The object of these grooves 4 and 5 is to provide means for placing the blocks in position in a wall built up therefrom, by rotating the blocks in the plane of the wall when placed between two parallel water tubes or pipes 13 and 14 as illustrated in Figure 6, or, on the other hand, that the blocks between any two tubes or pipes 13 and 14, or equivalents, may be removed without disturbing any other adjacent blocks between any of the other vertically parallel tubes or pipes by sliding the blocks to be removed upwardly beyond the upper row of adjacent blocks and then turning and withdrawing them.

Figure 3:
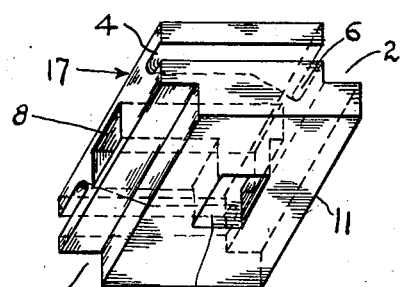
Figure 3 is an isometric view of another form of an air and water cooled refractory furnace block with an air inlet entering the air flue from the front.
Figure 4:
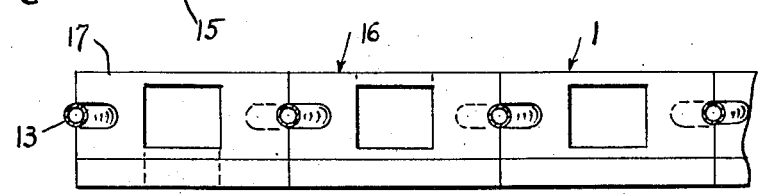
Figure 4 is a plan view of a wall section employing the blocks shown in Figures 1, 2 and 3.
Figure 5:
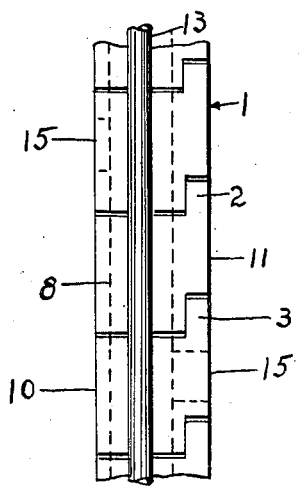
Figure 5 is a side elevation of the blocks in a wall.

The flue or duct 8 in all the blocks passes entirely through the block, from top to bottom, but certain of the blocks as 16, have passages at right angles to the vertical flue communicating with the outer surface of the block, while other blocks, as that numbered 17 shown in Figure 3, communicates with the inner surface, as indicated by 15.

Figure 7:
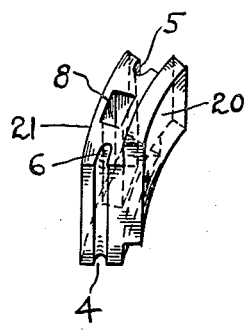
Figure 7 is an isometric view of a modified form of air and water cooled generator block.
Figure 8:
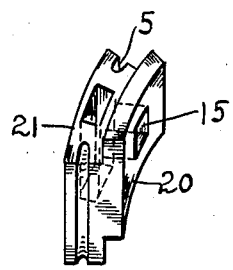
Figure 8 is an isometric view of said air and water cooled generator block with an inlet entering the air flue for the inside.
Figure 9:
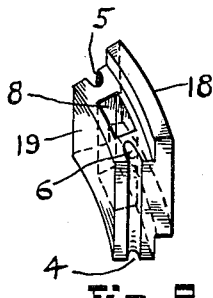
Figure 9 is an isometric view of another form of an air and water cooled generator block which may be utilized for building outside walls.
Figure 10:
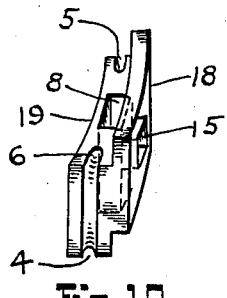
Figure 10 is an isometric view of another form of an air and water cooled generator block similar in character to that shown in Figure 9 except that there is an air inlet to the flue from the outside surface.

The generator blocks, indicated by Figures 7, 8, 9 and 10 are in general, similar to the blocks shown in Figures 1 to 6 inclusive, except Figures 9 and 10 show blocks that are utilized in building the outer wall, wherein 18 is the outer face of a generator wall and 19 is the face in proximity to the center of a composite wall built up of blocks of types such as shown in Figs. 7 and 9.

The inner wall generator blocks of Figs. 7 and 8 have an inner surface 20 and an outer surface 21.

Having thus described and illustrated the preferred embodiment of my invention, I do not desire to limit myself to the exact construction shown except so far as the same may be specifically claimed, since it is evident that modifications may be made without departing from the spirit of the invention or scope of the claims.

I claim:—

1. A furnace wall block having offset portions at two opposite edges for sliding overlapping engagement in the plane of the wall with adjacent similar blocks and grooves at the ends of the blocks extending between the two said edges adapted to engage cooling supporting means behind the offset portions, so that the block when positioned in a wall provides broken or irregular joints at the four edges of engagement.

2. An air and water cooled block having recesses at two opposite faces for interengaging with water-cooled supporting means and cooling air-passage means positioned in the body of the block between said faces and parallel thereto.

3. A wall block of the character described, having shoulders at two of its edges for overlapping sliding engagement with other similar blocks, and grooves at two other edges for interlocking engagement with cooling and supporting pipes, said grooves each being deepened at an end and said shoulders lying in a plane parallel to but spaced apart from the plane of the grooves, so that the block may be disengaged from its supports by rotation.

4. In a refractory wall construction, a plurality of substantially parallel water-cooled metallic supporting elements, a series of blocks positioned between a pair of such elements to form a portion of the wall, each block having recesses in two opposite faces engaging said elements in sliding contact therewith and held by them as against displacement inwardly or outwardly of the wall, and an air-circulation passage extending through said blocks in substantial parallelism with said elements.

5. In a refractory wall construction, a plurality of substantially parallel water-cooled metallic supporting elements, a series of blocks positioned between a pair of such elements to form a portion of the wall, each block having recesses in two opposite faces engaging said elements in sliding contact therewith and held by them as against displacement inwardly or outwardly of the wall, and an air-circulation passage extending through said blocks in substantial parallelism with said elements, together with complementary shoulders on adjacent blocks of the series extending transversely between said elements whereby relative sliding contact in the plane of the wall is maintained between blocks regardless of abutting contact.

6. In a refractory wall construction, a plurality of substantially parallel water-cooled metallic supporting elements, a series of blocks positioned between a pair of such elements to form a portion of the wall, each block having recesses in two opposite faces engaging said elements in sliding contact therewith and held by them as against displacement inwardly or outwardly of the wall, and an air-circulation passage extending through said blocks in substantial parallelism with said elements, said opposite recesses in each block being deepened at relatively opposite ends.

Signed at Jackson Heights in the county of Queens and State of New York this 23rd day of December A. D. 1925.

GEORGE W. DAVEY.